United States Patent Office 3,360,275
Patented Dec. 26, 1967

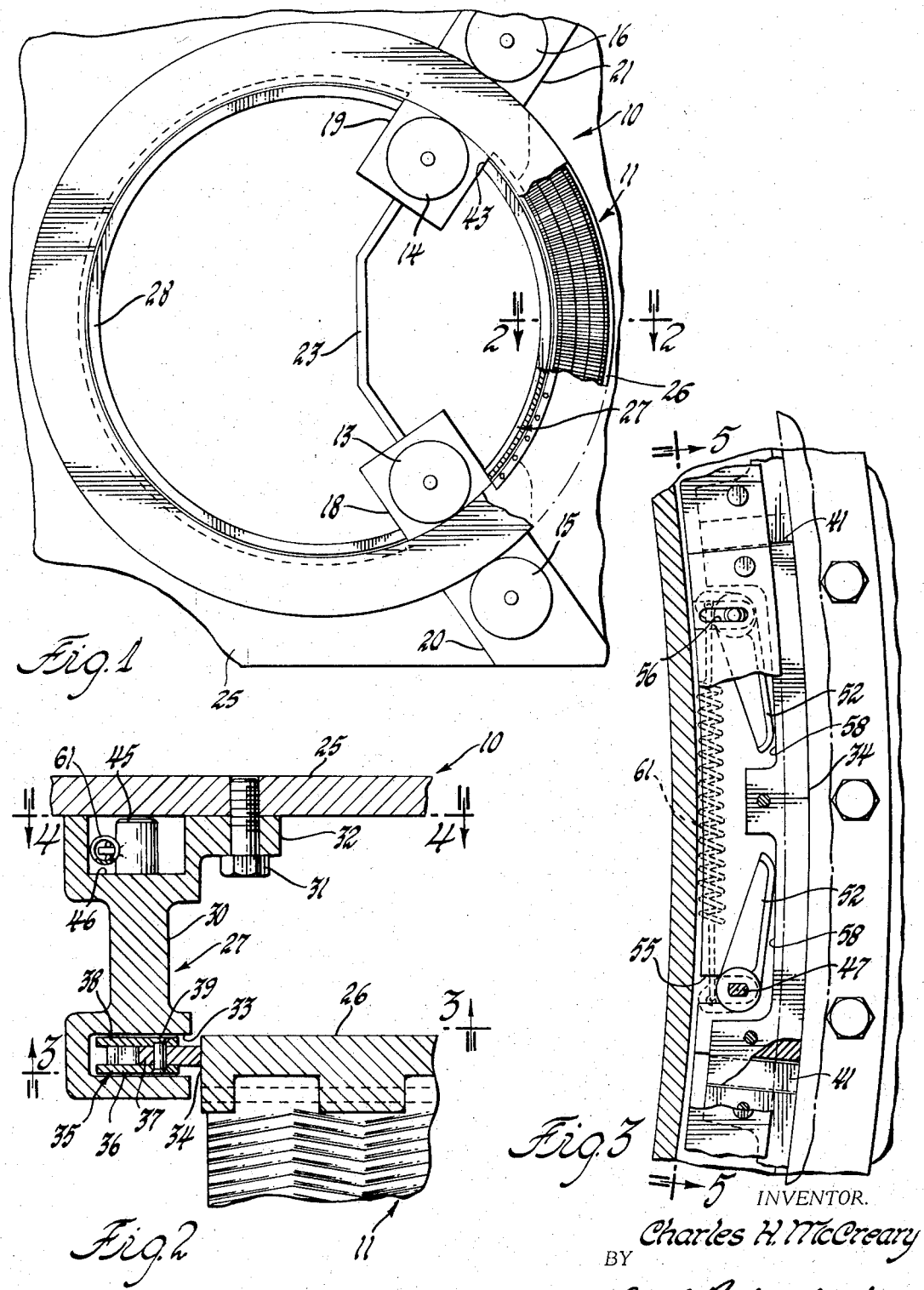

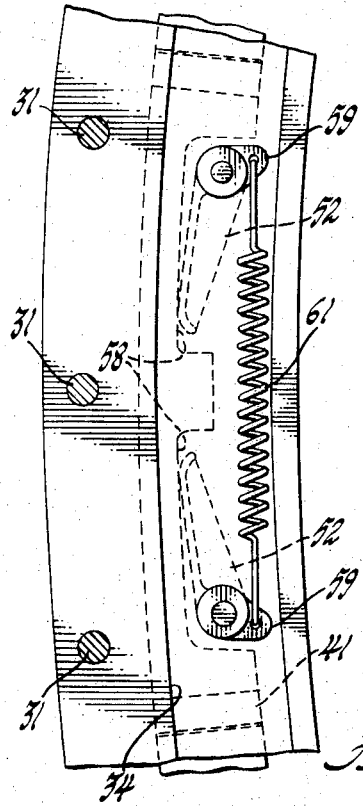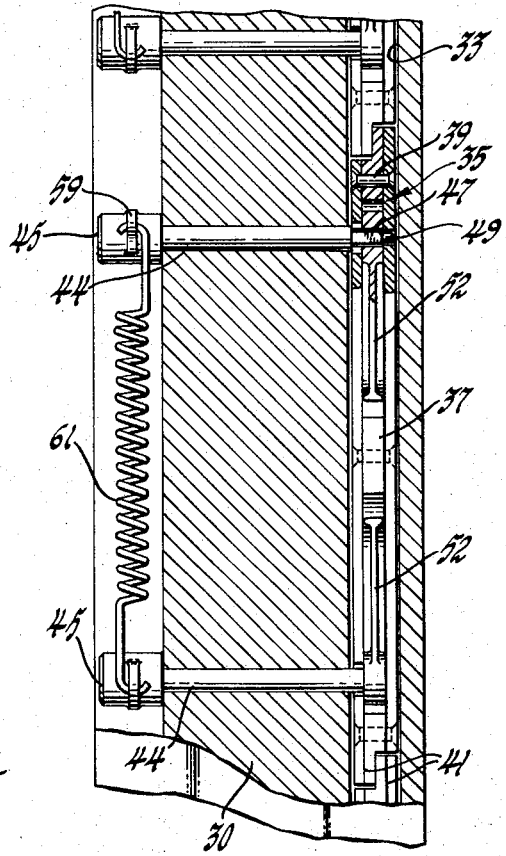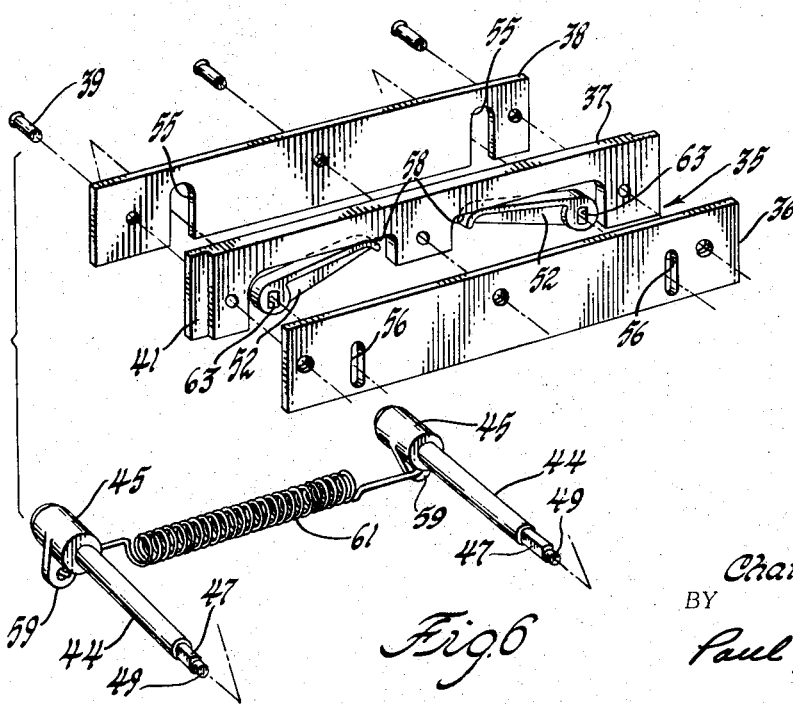

3,360,275
BY-PASS SEAL
Charles H. McCreary, Oak Park, Ill., assignor to General Motors Corporation, Detroit, Mich., a corporation of Delaware
Filed Jan. 25, 1966, Ser. No. 522,861
5 Claims. (Cl. 277—84)

My invention is directed to a contact type seal for relatively rotatable members of large and relatively variable diameters. It is intended for use as and is particularly suited to use as a rim or by-pass seal for a large radial flow rotary regenerator.

Rotary regenerators and matrices therefor of the radial flow or drum type are known and are described, for example, in United States Patents No. 2,888,248, which is directed primarily to a main seal for a regenerator, No. 2,937,010 on a matrix structure, No. 3,057,604 which illustrates a complete regenerator as part of a gas turbine engine, and No. 3,077,074 also showing a regenerator in a gas turbine, and United States patent application Ser. No. 361,444, filed April 21, 1964, now Patent No. 3,267,674, granted Aug. 23, 1966, of common ownership with this application, which discloses a different installation of a regenerator in a gas turbine engine.

Such a regenerator may be considered as comprising principally a housing, a bulkhead dividing the housing into two spaces, and a matrix drum rotatable in the housing and passing through the bulkhead so as to move through the two spaces. A gas to be heated flows radially through the matrix in one space and a gas which surrenders heat flows radially through the matrix in the other space. The regenerator includes means for locating, supporting, and rotating the matrix, main or bulkhead seals to limit leakage circumferentially of the matrix from one space to the other at the bulkhead, and by-pass seals which extend around the circumference of the matrix to obstruct leakage of gas past the ends of the matrix.

The nature of my by-pass seal invention and the advantages thereof will be clear to those skilled in the art from the succeeding detailed description of the preferred embodiment of my invention and the accompanying drawings thereof.

FIGURE 1 is a partial view of a rotary regenerator with parts cut away and in section taken on the plane perpendicular to the axis of the matrix.

FIGURE 2 is a fragmentary sectional view taken on the plane indicated by the line 2—2 in FIGURE 1.

FIGURE 3 is a sectional view with parts cut away taken on the plane indicated by the line 3—3 in FIGURE 2.

FIGURE 4 is a sectional view taken on the plane indicated by the line 4—4 in FIGURE 2.

FIGURE 5 is a sectional view taken on the plane indicated by the line 5—5 in FIGURE 3.

FIGURE 6 is an exploded view of the principal elements of the seal.

Since the details of the regeneratior structure are not material to understanding this invention, the regenerator is shown only generally in FIGURE 1. The regenerator includes a housing 10 within which an annular drum matrix 11 is mounted. The matrix is guided and rotated by rollers 13, 14, 15, and 16, rollers 13 and 14 engaging the inner periphery of the matrix and the rollers 15 and 16 engaging the outer periphery. These rollers are mounted in primary seal structures 18 and 19 which engage the inner surface of the matrix and 20 and 21 which engage the outer surface. The details of these primary seals are not illustrated. The portion of the primary seal which cooperates with the end faces of the matrix is not shown. The primary seals are mounted in a bulkhead 23 which extends to the case or housing. In the application of this regenerator to a gas turbine, compressed air flows through the portion of the matrix 11 to the right of the main seals and through a turbine which discharges it into the space to the left of the bulkhead from which it flows outwardly through the leftward portion of the matrix. The by-pass seals are provided between the rear wall 25 (FIGURE 2) of the case 10 and the rim or annular end ring 26 of the matrix. Similar seals (not illustrated) are provided between the other annular end ring 26 and the opposite wall or cover plate of the regenerator housing. The by-pass seal thus comprises, at each end of the matrix, a short arcuate seal assembly 27 at the high pressure side of the bulkhead 23 and a long arcuate seal section 28 at the low pressure side of the bulkhead. Since these are all essentially the same except for length and the fact that the seals at one end are left-handed to those on the other end of the matrix, only one of the sections 27 is described. The matrix may be of any suitable structure such, for example, as that described in United States patent application Ser. No. 484,219, filed Sept. 1, 1965, of common ownership with this application.

Referring to FIGURES 2 to 6, the by-pass seal comprises a curved support 30 concentric with the axis of the matrix 26 and fixed to the wall 25 of the housing by a series of bolts 31 passing through a flange 32. The support defines a slot 33 on its outer face concentric with and confronting the inner surface 34 of the matrix rim. The sealing operation is performed by a number of seal shoe assemblies 35, each comprising an inner end plate 36, a seal block 37, and an outer end plate 38. These are rigidly assembled by countersunk rivets 39. The shoes are free to move radially in the slot 33 but are restrained from movement circumferentially of the slot, and the radially outer face of the seal block 37 bears against the surface 34 to effect the seal. The seal blocks and end plates are configured as indicated at 41 to provide an overlap between adjacent seal shoes. At the ends where the seal shoe reaches the bulkhead seal, as at the point indicated by 43 in FIGURE 1, the end of the seal shoe is cut off square.

The means for locating the seal shoes and biasing them against the matrix includes two shafts 44 for each seal shoe journaled in bores in the support 30. Shaft 44 includes a head 45 disposed in a circumferential recess 46 in the support 30, a partially flattened lever mounting portion 47 and a terminal cylindrical portion 49. The flattened portion 47 lies within the slot 33. A pressure arm 52 is nonrotatably mounted on the flattened portion 47 of each shaft by a noncircular hole 63 in the arm. The shafts 44 pass with slight clearance through slots 55 in end plate 38. The end portion 49 of the shaft engages in a radial slot 56 in end plate 36. Thus, the end plates 36 and 38 are free to move radially of the matrix but are blocked against circumferential movement. The shafts 44 and arms 52 are disposed within recesses 58 in the inner surface of the seal block 37.

The head 45 of each shaft is integral with a short arm 59 having an opening in which a coil tension spring 61 is fitted. Spring 61 connects the arms 59 of the two shafts which coact with a particular seal shoe, exerting a force which rotates arms 52 and shafts 44 so as to press the seal block against the matrix. Springs 61 are located within the recess 46.

It will be seen from the foregoing that the seal biasing mechanism is quite compact and also quite simple. The action of springs 61 maintains the seal shoes in engagement with the matrix notwithstanding the fact that the matrix and the fixed structure of the regenerator may expand to different extents with temperatures and the fact that some distortion of these parts may occur.

It is important to provide adequate sealing contact, but also to minimize engaging force and thereby friction and wear. The spring and lever arm arrangement of my invention provides substantially constant seal-engaging force notwithstanding travel of the seal shoe over a wide range to accommodate large expansion or distortions, and notwithstanding seal shoe wear.

An important feature of the invention is that the spring such as spring 61 which biases the by-pass seal segments into engagement with the matrix is remote from the matrix and operates in a considerably lower temperature environment than the seal shoe which it biases. This is important because the matrix is quite hot and, if the spring were to be near the temperature of the matrix, its elastic properties would be seriously damaged.

The detailed description of the preferred embodiment of the invention for the purpose of explaining the principles thereof is not to be considered as limiting or restricting the invention, since many modifications may be made by the exercise of skill in the art.

I claim:

1. A by-pass seal for a rotary regenerator having a housing and a matrix rotatable therein, the seal comprising, in combination, an arcuate support mountable on the housing the support defining a slot coaxial with and adjacent to the matrix a plurality of seal shoes disposed end-to-end in the slot, each shoe having a face adapted to engage the matrix means coupling the shoes to the support restraining the shoes against movement along the slot and providing freedom of movement outward from the slot to engage the matrix two shafts rotatably mounted in the support for each shoe arms fixed on the shafts bearing against the shoe at the side opposite the matrix-engaging face a spring means for each shoe coupling the shafts and biasing the shafts to rotate so as to press the shoe against the matrix.

2. A seal as recited in claim 1 in which additional arms are fixed on the shafts and the spring means acts on the arms.

3. A seal as recited in claim 2 in which the spring means is a tension spring.

4. A seal as recited in claim 1 in which the support includes a recess against the housing and the spring means is disposed in the recess.

5. A seal as recited in claim 1 in which the seal shoes define abutments cooperating with the shafts to restrain the shoes from movement along the slot.

References Cited

UNITED STATES PATENTS

| | | | |
|---|---|---|---|
| 2,867,458 | 6/1959 | Kroekel | 277—149 X |
| 3,194,301 | 7/1965 | Kovats | 165—7 |
| 3,194,302 | 7/1965 | Kronogard | 165—9 |
| 3,216,487 | 11/1965 | Gallagher | 165—9 |

ROBERT A. O'LEARY, *Primary Examiner.*

T. W. STREULE, *Assistant Examiner.*